UNITED STATES PATENT OFFICE 2,542,020

DRILLING FLUID COMPOSITIONS

Paul W. Fischer, Long Beach, Calif., assignor to Union Oil Company of California, Los Angeles, Calif., a corporation of California No Drawing. Application July 15, 1949,
Serial No. 105,067

16 Claims. (Cl. 252—8.5)

This invention relates to drilling fluid compositions such as are employed in drilling oil and gas wells, and in particular concerns drilling fluid compositions of the nonaqueous or oil-base type. It further relates to the specific process whereby such compositions are obtained.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit and against the working face of the hole, and then upwardly to the surface through the annular space between the drill stem and the wall of the bore hole. The drilling fluid serves a number of purposes, among which are cooling and lubricating the drill bit, suspending and removing cuttings from the hole, preventing the flow of liquids from the formations traversed by the bore into the same by applying hydrostatic pressure to such formations, and fulfilling other requirements.

In locations where the underground formations traversed and/or penetrated by the bore contain materials such as hydratable clays which swell and/or disintegrate in the presence of water, it has become customary to employ drilling fluids which are substantially free of water. Such fluids are termed "oil-base" fluids since they usually comprise a mineral oil having dispersed or suspended therein minor proportions of various agents adapted to impart special properties to the composition. Among such agents, those most universally employed are: weighting agents, which are high density inert solids adapted to increase the apparent density of the base oil and thus increase the hydrostatic head provided by the drilling fluid within the bore; wall-building agents, which are materials such as clay or asphalt adapted to coat or plaster the walls of the bore with an impermeable layer which prevents the escape of the drilling fluid into permeable formations; and dispersing agents which serve to maintain solid components of the fluid uniformly dispersed therein. Oil-base drilling fluids may also comprise a variety of other agents such as gel strength improvement agents, viscosity-modifiers, emulsifying agents, protective colloids, inorganic salts, etc.

Of the various properties requisite to a satisfactory drilling fluid, that of coating the walls of the bore with a thin impermeable layer is one of the most important. Such layer serves to prevent loss of the drilling fluid into porous formations traversed by the bore. As previously mentioned, this property may be attained by including in the composition a relatively small proportion, e. g., 0.1–10 per cent by weight, of a clay such as bentonite or an asphaltic material. The effectiveness of such agents in preventing escape of the fluid into permeable formation is conveniently measured by determining the so-called "filtration rate" or "fluid loss value." Such determination consists of a simple filtration test wherein a sample of the drilling fluid is forced against a permeable membrane or filter under standardized conditions of temperature and pressure. The quantity of filtrate obtained after a given period of time is taken as the filtration rate value, usually expressed in milliliters/hour. Detailed procedure for making this determination is set forth in "Recommended Practice on Field Procedure for Testing Drilling Fluids," A. P. I. Code No. 29, July 1942. Ordinarily, it is desirable that the drilling fluid have a filtration rate below about 4.0 ml./hr.

While the filtration rate of a drilling fluid composition is highly dependent upon the nature and quantity of the wall-building component of the composition, it has been found that the dispersing agent which is usually provided to maintain solid components uniformly suspended in the composition is likewise of great influence on the filtration rate, particularly if such dispersing agent is of the metal soap type. Accordingly, a number of specific metal soaps, e. g. soaps of diolefinic or triolefinic fatty acids, tall-oil soaps, etc., have been recommended as imparting superior wall-building properties to drilling fluid compositions in which they are incorporated. However, many of the metal soaps previously recommended for improving the wall-building characteristics of certain specific drilling fluid compositions do not so function with respect to other compositions or do not effect the desired improvement to a sufficient degree. Also, in many instances the improvement in wall-building properties is secured at the expense of other properties. Thus, a metal soap which may improve the wall-building properties of a particular drilling fluid may at the same time adversely affect the viscosity of the composition and/or alter other properties in an undesirable manner. In other instances, use of an otherwise satisfactory particular metal soap may be economically unfeasible, or may not provide a sufficient degree of stability to the composition. In still other instances, drilling fluids which have shown promise when evaluated by the customary laboratory tests have failed during actual field operations, presumably because they did not remain stable under the pressure and temperature conditions existing within the bore hole.

It is accordingly an object of the present invention to provide improved oil-base drilling fluids characterized by excellent wall-building properties as indicated by their very low filtration rate values.

Another object is to provide oil-base drilling fluid compositions comprising metal soap-type dispersing agents which in addition to maintaining solid components of the compositions stably dispersed in the base oil also effect a high degree of improvement in the wall-building properties of the compositions.

A further object is to provide oil-base drilling fluid compositions containing readily available and low-cost metal soaps which impart a high degree of stability and excellent wall-building properties to the fluid without adversely affecting its viscosity.

A still further object is to provide a method for preparing such compositions.

Other objects will be apparent from the following detailed description of the invention, and many advantages not specifically referred to herein will occur to those skilled in the art upon employment of the invention in practice.

I have now found that the above and related objects may be realized in drilling fluid compositions comprising certain metal resinate dispersing agents. More particularly, I have found that compositions prepared by dispersing in mineral oil controlled amounts of partially saponified modified rosin and an alkaline-earth metal base along with a hydratable clay and water have physical and chemical properties rendering them admirably suited for use as drilling fluids. Such compositions are formed as uniform stable dispersions which do not separate or become flocculated under the high pressure and temperature conditions that exist in deep well bores. They have excellent wall-building properties as indicated by their very low filtration rates, and have satisfactory viscosity characteristics. Moreover, they are not subject to decomposition as by fermentation, and are readily prepared without the use of special equipment or techniques. If desired, various special addition agents, e. g., weighting agents, gel strength improvement agents, etc., may readily be incorporated in these compositions to provide special properties without adversely altering their stability and fluid loss characteristics.

The invention thus consists in oil-base drilling fluid compositions prepared by dispersing in a mineral oil base a minor proportion each of partially saponified modified rosin, an alkaline-earth metal base, a hydratable clay and water. These compositions are complex colloid systems whose exact chemical composition is made uncertain by the fact that certain of the components react with each other to an unknown extent. Accordingly, the new compositions of the invention are herein described and claimed by their method of preparation rather than in terms of their chemical composition which at best can only be speculative.

The partially saponified modified rosin employed in preparing the new drilling fluid compositions is the product obtained by reacting wood rosin which has previously been heat-treated to modify the resin acids with an aqueous alkali-metal alkali, e. g., sodium hydroxide, sodium carbonate, potassium hydroxide, etc., in such manner that the saponification reaction is only partially complete and the saponified product contains from about 1 to about 15 per cent of free unsaponified resin acids. The heat-treatment of wood rosin, i. e., rosin which has been extracted from pine wood stumps, whereby the resin acids thereof are isomerized and/or otherwise modified is well known in the naval stores art, and may be effected in various ways to obtain modified rosin products which vary somewhat in their physical and chemical properties depending upon the nature and extent of the heat-treatment. Thus, any of the various color grades of refined wood rosin may be heated under non-oxidizing conditions at temperatures between about 250° C. and about 350° C. for a length of time sufficient to raise the specific rotation of the rosin from its original negative value to a value between about +5° and about +15°. The resulting rosin product closely resembles the original rosin in appearance, ease of saponification, etc., but is considerably altered chemically as evidenced by its increased specific rotation, increased dehydroabietic acid content, lower iodine number, etc. By carrying out the heat-treatment at somewhat higher temperatures and/or over longer periods of time, the specific rotation may be raised further, e. g., to +25° or even higher, and the degree of olefinic unsaturation further decreased. Also, under such conditions decarboxylation takes place with the formation of unsaponifiable bodies which are usually referred to as rosin oils. As is more fully pointed out hereinafter, a saponified rosin product which is preferred for use according to the present invention is obtained from wood rosin which has been heat-treated under such conditions of time and temperature that decarboxylation has taken place to a substantial extent and the heat-treated product contains a substantial proportion of unsaponifiable materials. The heat-treatment of wood rosin to secure the desired modification of the resin acids as indicated by increase in specific rotation and decrease of iodine number may also be effected in the presence of catalysts at relatively low temperatures as described in U. S. Patent 2,154,629. The catalysts employed are of the hydrogenation type, e. g., metallic platinum or palladium, although the treatment is carried out in the absence of added hydrogen. The reaction which takes place is termed "disproportionation" since it involves the simultaneous hydrogenation and dehydrogenation of abietic-type acids with the consequent formation of dihydroabietic and dehydroabietic acids and their analogues, and the resulting product is usually referred to as "disproportionated wood rosin."

Any of the above described modified rosin products may be used to obtain the saponification products employed in preparing the drilling fluid composition of the present invention. Procedure for carrying out the saponification reaction is well known in the art, and in general consists merely of adding the modified rosin in the solid or molten state to a hot aqueous solution of the desired alkali-metal alkali and thereafter heating the mixture until the reaction is complete and the product contains the desired amount of water. The amount of alkali employed is somewhat less than that required for complete saponification of the resin acids in order that the saponification product may contain the requisite amount of free unsaponified resin acids. The concentration of the aqueous alkali is usually so adjusted that the product obtained takes the form of a viscous liquid or thick paste containing 60-85 per cent solids. The physical form of the product also depends somewhat upon the type of modified rosin employed. The saponification product obtained from partially decarboxylated wood rosin containing a substantial amount of rosin oils, for example, is a relatively fluid liquid even though it may contain only 5-10 per cent of water.

While any of the alkali-metal alkali saponification products of wood rosin which has been heat-treated in the presence or absence of a catalyst to effect a substantial increase in its specific rotation and a substantial decrease in the degree of olefinic unsaturation as indicated by a corresponding decrease in iodine number may be employed in preparing the present drilling fluids, I have found that superior results, particularly with respect to the filtration rate of the drilling fluid, are attained by employing the alkali-metal alkali saponification products of wood rosin which has been heat-treated at temperatures between about 250° C. and about 350° C. to such an extent that substantial decarboxylation has occurred with the formation of unsaponifiable rosin oils. Such a heat-treated wood rosin may comprise, for example, 50-60 per cent free resin acids, 30-40 per cent unsaponifiable oils, and small amounts of phenolic materials, water and products of unknown constitution. A particularly preferred product of this type is the potassium hydroxide saponification product of such a partially decarboxylated wood rosin. Such product contains about 45-55 per cent potassium resin acid soaps, 30-35 per cent unsaponifiable materials, 5-10 per cent free resin acids, and 5-10 per cent water.

The alkaline-earth metal base employed in preparing the new drilling fluids may be any oxide, hydroxide or basic salt of any of the alkaline-earth metals, e. g., calcium oxide, calcium hydroxide, barium hydroxide, strontium hydroxide, calcium acetate, etc. Calcium hydroxide, e. g., ordinary hydrated lime, is preferred for reasons of low cost and general availability.

The hydratable clay component is preferably a high quality material such as bentonite, montmorillonite, or kaolinite, but may be common clay such as is available in almost any locality. Bentonite is preferred.

The base oil which forms the major component of the new compositions is preferably of mineral origin and may be crude petroleum or a distillate or residuum material. Heavier materials as light tars, cracked residua, heavy extracts, and the like are especially well suited, particularly when blended with a light distillate such as gas oil, Diesel fuel, etc. A highly satisfactory mixed base of this type comprises a major proportion, e. g., 60-90 per cent, of a relatively heavy oil such as a light residual oil having a specific gravity of about 13°-15° API and a viscosity of about 30-40 seconds SSF at 122° F. and containing a substantial proportion of asphaltenes, polymeric bodies and the like, and a minor proportion, e. g., 10-40 per cent, of a light distillate such as a Diesel fuel having a specific gravity of about 25°-35° API and a viscosity of about 30-50 seconds SUS at 100° F. The invention, however, is not limited to the use of any particular types of oil or mixtures thereof, and any of the oil bases known in the art may be satisfactorily employed. The use of mixed oil bases is in general described and claimed in the copending application of Fischer and Scott, Serial No. 4,213, filed January 24, 1948.

The proportions in which the various essential components are employed in preparing the new compositions may be varied between certain limits depending upon the identity of such components and the specific properties desired in the composition. Ordinarily, however, the partially saponified modified rosin containing from about 1 to about 15 per cent of free resin acids is employed in an amount representing between about 0.2 and about 10, preferably between about 2 and about 8, per cent by weight of the entire composition. The alkaline-earth metal base is employed in an amount representing between about 0.1 and about 5, preferably between about 0.4 and about 2, per cent by weight of the entire composition depending upon its chemical identity, and is usually provided in an amount slightly in excess of the quantity chemically equivalent to the resin acid soaps present. The hydratable clay may be provided in an amount representing between about 0.1 and about 5, preferably between about 0.4 and about 1.2, per cent by weight of the entire composition, and the water is provided in an amount representing between 0.2 and about 10, preferably between about 1 and about 5, per cent by weight of the entire composition. These proportions of water include any water which may be contained in the partially saponified rosin product, and accordingly the amount of water actually added during preparation of the composition will be adjusted according to the water content of the partially saponified rosin product so that the final composition contains water in the above mentioned proportions.

The exact manner and order in which the saponified rosin, alkaline-earth metal base, hydratable clay and water are dispersed in the base oil are not of primary importance, and if desired the requisite amounts of each of these ingredients may simply be added to the entire quantity of the base oil at ordinary temperatures while employing more or less vigorous agitation or stirring to secure a uniform composition. Such operation may be carried out at the well site in the conventional mud pits with agitation being effected by circulating the mixture from one pit to another. However, I have found that a more convenient mode of preparation which provides more highly uniform compositions consists in forming an intermediate concentrate composition which is subsequently diluted with the base oil to obtain the finished drilling fluid. According to one mode of operation, the alkaline-earth metal base is suspended in a portion of the base oil, after which the partially saponified modified rosin product is added with vigorous stirring. The hydratable clay and water are then added to the mixture, either separately or together, and stirring is continued to obtain a homogeneous concentrate composition. Such composition can be diluted with the remainder of the base oil at any subsequent time to obtain the finished product. According to an alternative and preferred procedure, the saponified modified rosin product is dispersed in a part of the base oil, after which the hydratable clay and water are added with vigorous stirring to obtain a homogeneous composition. When the base oil comprises a mixture of a light and a heavy oil as previously described, it is preferred that the light oil component be employed in forming the initial dispersion of the unsaponified rosin, hydratable clay and water. Such dispersion forms a concentrate composition which, if desired, can be stored and shipped as such and subsequently be combined with the alkaline-earth metal base and be diluted with the remainder of the base oil to obtain the finished product. This procedure may be employed in preparing a preferred composition as follows: 500–550 parts by weight of the previously described potassium hydroxide saponification product of partially decarboxylated wood rosin, 50–55 parts by weight of bentonite, and 35–40 parts by weight of water are dispersed in 1000 parts by weight of the light distillate hereinbefore described to form a concentrate composition which can be stored indefinitely. When it is desired to form the finished drilling fluid, for example at the well site, 50–55 parts by weight of hydrated lime are stirred into the concentrate composition and stirring is continued for ½ to 2 hours, after which there is then added 6500–7000 parts by weight of the previously described heavy oil. If desired a part of the light oil, e. g., 50–75 per cent, may be withheld from the concentrate composition and later added along with the hydrated lime.

In many instances it will be desired that the composition contain a weighting agent to increase its apparent density and thus render it capable of providing a greater hydrostatic head within the bore hole during use. Such agent is preferably added to the composition upon completion of the procedure described above, and may be employed in amounts sufficient to provide a composition having an apparent density from about 65 lbs./cu. ft. to as high as 130 lbs./cu. ft. Suitable weighting agents include finely divided whiting, barytes, iron oxides, lead dust, fuller's earth, calcined clay, calcium carbonate, and other high density inert solid materials. Also, if desired, the new compositions may optionally contain small amounts of other agents, such as sodium silicate for improving gel strength, carbohydrate or protein colloids for improving stability, and any of the other additive agents commonly employed in oil-base drilling fluid formulation.

The following examples will illustrate several ways in which the principle of the invention has been applied, but are not to be construed as limiting the same. All proportions are given in parts by weight.

Example I

To 3915 parts of a domestic Diesel fuel having the following specifications:

| | |
|---|---|
| Gravity, °API | 31.0 |
| Viscosity, SUS at 100° F | 40 |
| Flash point, °F | 180 |
| Ash, per cent by wt | 0.01 |
| Sulfur, per cent by wt | 0.9 |
| Boiling range, °F | 400–720 | there was added 210 parts of finely-divided hydrated lime. The oil was vigorously stirred during addition of the lime, and while stirring was continued there was added 2100 parts of the potassium hydroxide saponification product of partially decarboxylated wood rosin. This product was a dark-colored highly viscous fluid obtained by saponifying N wood rosin which had been heat-treated at about 280°–320° C. for 2–4 hours with aqueous potassium hydroxide. It comprised about 50 per cent of the potassium soaps of modified resin acids, about 7 per cent of unsaponified resin acids, about 33 per cent of unsaponifiable rosin oils, and about 10 per cent water. Stirring of the mixture was continued while there was then added a suspension of 210 parts of Wyoming bentonite ("Aquagel") in 140 parts of water. Finally there was added 26,410 parts of a light domestic fuel oil having the following specifications:

| | |
|---|---|
| Gravity, °API | 14.5 |
| Viscosity, SSF at 122° F | 36 |
| Flash point, °F | 170 |
| Ash, per cent by wt | 0.06 |
| Sulfur, per cent by wt | 2.5 |

The resulting composition was a homogeneous fluid having an apparent density of about 60 lbs./cu. ft., a Marsh funnel viscosity of about 125 seconds and a filtration rate value of 0.0 ml./hr.

Example II

A base oil was prepared by blending equal parts by volume of light and heavy California crude oils having the following specifications:

| | Light Crude | Heavy Crude |
|---|---|---|
| Gravity, °API | 28.5 | 16.9 |
| Viscosity, SUS at 100° F | 65 | 856 |
| Sulfur, per cent by wt | 1.42 | 1.91 |
| Water, per cent by wt | 0.3 | 3.4 |
| Distillation Inspection: | | |
| Gasoline, per cent by vol | 30.3 | 5.0 |
| Gas Oil, per cent by vol | 31.8 | 33.4 |
| Residuum, per cent by vol | 36.5 | 60.7 |
| Loss, per cent by vol | 1.4 | 0.9 |

A 20-barrel volume of the light crude oil was placed in a 50-barrel tank fitted with a circulating pump and a mixing gun so that the contents of the tank could be thoroughly mixed. Approximately 240 pounds of hydrated lime, 3500 pounds of the potassium hydroxide saponification product of partially decarboxylated wood rosin described above in Example I, 0.36 barrel of water and 400 pounds of Wyoming bentonite were added to the light crude oil, and the mixture was thoroughly circulated and mixed to form a homogeneous composition. Subsequently, 120 pounds of unslaked lime was added and mixed in. The concentrate composition so obtained was then added to tank containing 416 barrels of the base oil comprising equal parts of the light and heavy crudes described above. Two 20-barrel volumes of the composition so obtained were taken and the proportion of ingredients given above were subsequently added to form two additional batches of concentrate composition. These concentrates were then mixed into the initial composition, whereby there was obtained 450 barrels of drilling fluid. The proportion of ingredients employed in preparing this fluid was as follows:

| | Percent by weight |
|---|---|
| Light crude oil | 45.2 |
| Heavy crude oil | 46.2 |
| Saponified rosin product | 5.8 |
| Hydrated lime | 0.5 |
| Water | 1.3 |
| Wyoming bentonite | 0.8 |
| Unslaked lime | 0.2 |
| | 100.0 |

To this fluid there was then added 1 per cent of a 40 per cent aqueous solution of sodium silicate to serve as a gel strength improvement agent, and sufficient finely-divided calcium carbonate and barytes to raise the apparent density of the composition to about 80 lbs./cu. ft.

The above composition was employed to drill through the main producing formation in a well located in the Santa Paula field of Southern California. The well had been drilled to a depth of 2131 feet with a conventional water-base drilling fluid, at which point the present oil-base fluid was substituted for the water-base fluid and drilling was continued to a depth of 3316. At a depth of 3300 feet the water content of the fluid was found to be about 2.0 per cent, indicating very little connate water contamination. At a depth of 2950 feet the viscosity (Marsh) of the fluid rose to about 324 seconds whereupon 80 barrels of Diesel oil were blended into the fluid to reduce its viscosity. During the drilling the gel strength increased from an initial value of about 3.5 lbs./100 sq. ft. to a value of about 6 lbs./100 sq. ft. The completed well came into production at a rate of 200 barrels per day which thereafter gradually decreased to 100 barrels per day. A comparison of the performance of this well with that of adjacent wells indicated that the completion was unusually successful. This is attributed to the fact that the drilling fluid employed performed very well during drilling through the producing horizons, and that the producing formations were not adversely affected by the drilling fluid as is apparently the case with most other fluids.

*Example III*

Approximately 350 pounds of hydrated lime, 3600 pounds of the potassium hydroxide saponification product of partially decarboxylated wood rosin described in Example I, one barrel of water and 400 pounds of Wyoming bentonite were mixed into 20 barrels of a crude oil having the following specification:

| | |
|---|---:|
| Gravity, °API | 24.9 |
| Viscosity, SUS at 100° F. | 187 |
| Sulfur, percent by wt. | 2.5 |
| Distillation inspection: | |
| Gasoline percent by vol. | 26.1 |
| Gas oil, percent by vol. | 28.6 |
| Residuum, percent by vol. | 45.2 |
| Loss, percent by vol. | 3.1 |

Mixing was continued for ten minutes, after which the composition was circulated into 210 barrels of the crude oil. Circulation mixing was continued for an hour and ten minutes to insure a homogeneous composition. A second batch of fluid was prepared in the same manner and the two batches were mixed to obtain 460 barrels of fluid. This fluid was employed for the completion of a well which had previously been drilled to a depth of 4662 feet. During the completion drilling the viscosity of the drilling fluid varied from 152 to 157 seconds Marsh while the apparent density remained constant at 60 lbs./cu. ft. No weighting agent was employed in the fluid. The performance of the drilling fluid was completely satisfactory, and the well was completed at a depth of 5255 feet and compared very favorably in performance with other wells in the immediate vicinity.

*Example IV*

Approximately 18 parts of hydrated lime, 18 parts of bentonite, 12 parts of water, and 30 parts of the sodium soap of disproportionated wood rosin were stirred into 150 parts of a typical gas oil. The sodium soap was a highly viscous, amber-colored, translucent fluid, and was obtained by the caustic soda saponification of wood rosin which had been heat-treated in the liquid state under relatively mild temperature conditions in the presence of a palladium catalyst whereby the rosin acids were modified by disproportionation to form dehydroabietic acid and the like. This product is available commercially under the trade name "Dresinate 731." It had an acid number of 15.6, indicating the presence of free resin acids. The mixture was stirred for about ½ hour whereby all of the ingredients became homogeneously dispersed in the gas oil to form a concentrate-type of composition. Approximately 7 parts of sodium silicate in the form of commercial aqueous "water glass" and 150 parts of whiting were then stirred into the concentrate composition, after which there were then added 1350 parts of the domestic fuel oil described in Example I. The resulting composition was a smooth homogeneous fluid having a Marsh funnel viscosity of about 250 seconds at 115° F., and filtration rate values of 1.0 ml./15 minutes and 3.8 ml./hr.

*Example V*

A sample of K wood rosin having an acid number of 170 and an iodine number of 170 was heated at 270° C. for 3 hours. During heating, a small amount of a light yellow viscous oil was driven off and was collected and re-combined with the rosin. The heat-treated rosin product had an acid number of 143 and an iodine number of 128, indicating that some decarboxylation and considerable modification of the rosin acids had been effected by the heat treatment. A 200-gram sample of this product was melted and poured into a hot solution of 25 grams of potassium hydroxide dissolved in 30 grams of water. The mixture was heated at 85° C. for 1 hour to effect the saponification reaction. The saponified product was a stiff paste-like material and had an acid number of about 19, indicating the presence of a small amount of free unsaponified resin acids. A 60-gram sample of this product was stirred into 60 grams of gas oil along with 18 grams of bentonite and 12 grams of water. There was then added 12 grams of hydrated lime and 120 grams of the gas oil, and the mixture was stirred for ½ hour. Finally, there was added about 1200 grams of light domestic fuel oil, 7.5 grams of aqueous sodium silicate and 150 grams of whiting. The resulting composition was a stable gel-like dispersion having good drilling fluid characteristics.

Various modifications within the scope of the invention will be apparent to those skilled in the art. Such modifications may include the use of specific types of hydratable clays, various types of weighting agents, viscosity modifiers, gel strength improvement agents, and various types and blends of base oils, as well as different alkaline-earth metal bases and saponified rosin products prepared from different types of heat-treated wood rosins and different alkali-metal alkalies. The essence of the invention lies in the use of a hydratable clay, an alkaline-earth metal base and water in combination with a product obtained by saponifying with an aqueous alkali-metal alkali a wood rosin which has been heat-treated to modify the various resin acids contained therein as indicated by a substantial decrease in olefinic unsaturation (iodine number) and a substantial increase in specific rotation, and which contains from about 1 to about 15 per cent by weight of free resin acid. As previously mentioned, the exact chemical composition of the drilling fluids provided by the invention is uncertain. Reaction between the saponified rosin product and the alkaline-earth metal base presumably occurs during the preparation of the composition and its subsequent use as a drilling fluid, but the extent to which such reaction takes place can not accurately be determined. It has been found, however, that the superior properties of the present drilling fluids can not be attained by employing an alkaline-earth metal soap of the herein described modified wood rosin in lieu of the alkali-metal alkali saponification product and the alkaline-earth metal base, nor can these properties be secured by using the alkali-metal saponification product in the absence of the alkaline-earth metal base.

This application is a continuation-in-part of my copending application Serial No. 40,171, filed July 22, 1948.

Other modes of applying the principle of my invention may be employed, change being made as regards the materials or procedure employed provided the composition stated by any of the following claims be obtained, or the step or steps stated by any of the following claims be employed.

I, therefore, particularly point out and distinctly claim as my invention:

1. A drilling fluid composition prepared by dispersing in a mineral oil: between about 0.1 and about 5 per cent by weight of a hydratable clay; between about 0.1 and about 5 per cent by weight of an alkaline-earth metal base; between about 0.2 and about 10 per cent by weight of water; and between about 0.2 and about 10 per cent by weight of a saponification product obtained by saponifying with an aqueous alkali-metal alkali a wood rosin which has been heat-treated under conditions of time and temperature sufficient to raise its specific rotation to a value above about +5°, said saponification product containing between about 1 and about 15 per cent by weight of free resin acid.

2. A drilling fluid composition prepared by dispersing in a mineral oil: between about 0.4 and about 1.2 per cent by weight of a hydratable clay; between about 0.4 and about 2 per cent by weight of an alkaline-earth metal base; between about 1 and about 5 per cent by weight of water; and between about 2 and about 8 per cent by weight of a saponification product obtained by saponifying with an aqueous alkali-metal alkali a wood rosin which has been heat-treated under conditions of time and temperature sufficient to raise its specific rotation to a value above about +5°, said saponification product containing between about 1 and about 15 per cent by weight of free resin acid.

3. A composition according to claim 1 wherein the alkaline-earth metal base is hydrated lime.

4. A composition according to claim 1 wherein the alkaline-earth metal base is calcium oxide.

5. A composition according to claim 1 wherein the hydratable clay is bentonite.

6. A composition according to claim 1 wherein the saponification product is obtained from wood rosin which has been heat-treated at a temperature between about 250° C. and about 350° C. for a length of time sufficient to raise its specific rotation to a value above about +5°.

7. A composition according to claim 1 wherein the saponification product is obtained from rosin which has been treated with a hydrogenation catalyst in the absence of added hydrogen to effect a substantial degree of disproportionation.

8. A composition according to claim 1 wherein the saponification product is obtained from wood rosin which has been heat-treated under conditions of time and temperature sufficient to effect a substantial degree of decarboxylation.

9. A composition according to claim 1 wherein the saponification product is a potassium hydroxide saponification product of partially decarboxylated wood rosin, said product comprising between about 45 and about 55 per cent by weight of potassium resin acid soaps, between about 30 and about 35 per cent by weight of unsaponifiable materials, between about 5 and about 10 per cent by weight of free resin acids, and between about 5 and about 10 per cent by weight of water.

10. A drilling fluid composition prepared by dispersing in mineral oil: between about 0.4 and about 1.2 per cent by weight of bentonite; between about 0.4 and about 2 per cent by weight of hydrated lime; between about 1 and about 5 per cent by weight of water; and between about 2 and about 8 per cent by weight of a saponification product obtained by saponifying with an aqueous alkali-metal alkali a wood rosin which has been heat-treated at a temperature between about 250° C. and about 350° C. for a length of time sufficient to raise its specific rotation to a value above about +5°, said saponification product containing from about 1 to about 15 per cent by weight of free resin acid.

11. A drilling fluid composition prepared by dispersing in mineral oil: between about 0.4 and about 1.2 per cent by weight of bentonite; between about 0.4 and about 2 per cent by weight of hydrated lime; between about 1 and about 5 per cent by weight of water; and between about 2 and about 8 per cent by weight of a saponification product obtained by saponifying with an aqueous alkali-metal alkali a wood rosin which has been heated in the presence of a hydrogenation catalyst but in the absence of added hydrogen under conditions of time and temperature sufficient to raise its specific rotation to a value above about +5°, said saponification product containing between about 1 and about 15 per cent by weight of free resin acid.

12. A drilling fluid composition prepared by dispersing in mineral oil: between about 0.4 and about 1.2 per cent by weight of bentonite; between about 0.4 and about 2 per cent by weight of calcium oxide; between about 1 and about 5 per cent by weight of water; and between about 2 and about 8 per cent by weight of a saponification product obtained by saponifying with an aqueous alkali-metal alkali a wood rosin which has been heat-treated under conditions of time and temperature sufficient to raise its specific rotation to a value above about +5°, said saponification product containing between about 1 and about 15 per cent by weight of free resin acid.

13. A drilling fluid composition prepared by dispersing in mineral oil: between about 0.4 and about 1.2 per cent by weight of bentonite; between about 0.4 and about 2 per cent by weight of hydrated lime; between about 1 and about 5 per cent by weight of water; and between about 2 and about 8 per cent by weight of a potassium hydroxide saponification product of wood rosin which has been heat-treated under conditions of time and temperature sufficient to raise its specific rotation to a value above about +5°, said saponification product comprising between about 45 and about 55 per cent by weight of potassium resin acid soaps, between about 30 and about 35 per cent by weight of unsaponifiable materials, between about 5 and about 10 per cent by weight of free resin acids, and between about 5 and about 10 per cent by weight of water.

14. The method of making a drilling fluid composition which comprises dispersing in mineral oil a hydratable clay, water, and a saponification product obtained by saponifying with an aqueous alkali-metal alkali a wood rosin which has been heat-treated under conditions of time and temperature sufficient to raise its specific rotation to a value above about $+5°$, said saponification product containing between about 1 and about 15 per cent by weight of free resin acids; adding to the resulting dispersion an alkaline-earth metal base; stirring the mixture for from ½ to 2 hours; and thereafter adding a further quantity of mineral oil, the components being employed in the following proportions based on the weight of the entire composition:

Hydratable clay, between about 0.5 and about 5 per cent.
Alkaline-earth metal base, between about 0.1 and about 5 per cent.
Water, between about 0.2 and about 10 per cent.
Saponification product, between about 0.2 and about 10 per cent.
Mineral oil, remainder.

15. The method of making a drilling fluid which comprises dispersing in 1000 parts by weight of a light petroleum distillate having a specific gravity of about 25°–35° API and a viscosity of about 30–50 seconds SUS at 100° F.: from about 50 to about 55 parts by weight of bentonite; from about 35 to about 40 parts by weight of water; and from about 500 to about 550 parts by weight of a potassium hydroxide saponification product of wood rosin which has been heat-treated under conditions of time and temperature sufficient to raise its specific rotation to a value above about $+5°$, said saponification product containing between about 45 and about 55 per cent by weight of potassium resin acid soaps, between about 30 and about 35 per cent by weight of unsaponifiable materials, between about 5 and about 10 per cent by weight of free resin acids, and between about 5 and about 10 per cent by weight of water; adding to the resulting dispersion from about 50 to about 55 parts by weight of hydrated lime; stirring the mixture for from about ½ to about 2 hours; and thereafter adding from about 6500 to about 7000 parts by weight of a light residual oil having a specific gravity of about 13°–15° API and a viscosity of about 30–40 seconds SSF at 122° F.

16. The method of making a drilling fluid which comprises dispersing in 1000 parts by weight of a light petroleum distillate having a specific gravity of about 25°–35° API and a viscosity of about 30–50 seconds SUS at 100° F.: from about 50 to about 55 parts by weight of bentonite; from about 35 to about 40 parts by weight of water; and from about 500 to about 550 parts by weight of a potassium hydroxide saponification product of wood rosin which has been heat-treated under conditions of time and temperature sufficient to raise its specific rotation to a value above about $+5°$, said saponification product containing between about 45 and about 55 per cent by weight of potassium rosin acid soaps, between about 30 and about 35 per cent by weight of unsaponifiable materials, between about 5 and about 10 per cent by weight of free resin acids, and between about 5 and about 10 per cent by weight of water; adding to the resulting dispersion from about 50 to about 55 parts by weight of hydrated lime; stirring the mixture for from about ½ to about 2 hours; adding from about 6500 to about 7000 parts by weight of a light residual oil having a specific gravity of about 13°–15° API and a viscosity of about 30–40 seconds SSF at 122° F.; from about 10 to about 20 parts by weight of sodium silicate; and sufficient of an inert weighting material to provide the composition with an apparent density between about 70 and about 120 lbs./cu. ft.

PAUL W. FISCHER.

REFERENCES CITED

The following references are of record in the file of this patent:

UNITED STATES PATENTS

| Number | Name | Date |
| --- | --- | --- |
| 2,316,967 | Miller | Apr. 20, 1943 |
| 2,350,154 | Dawson | May 30, 1944 |
| 2,356,776 | Miller | Aug. 29, 1944 |
| 2,363,499 | Campbell | Nov. 28, 1944 |
| 2,430,039 | Anderson | Nov. 4, 1947 |
| 2,461,483 | Self | Feb. 8, 1949 |